United States Patent

[11] 3,528,390

[72] Inventor Charles A. Lee
 Knoxville, Tennessee
[21] Appl. No. 766,866
[22] Filed Oct. 11, 1968
[45] Patented Sept. 15, 1970
[73] Assignee By mesne assignments, to
 Appleton Wire Works Corporation
 Appleton, Wisconsin
 a corporation of Wisconsin

[54] FILTER TYPE ANIMAL CAGE COVER
 8 Claims, 5 Drawing Figs.
[52] U.S. Cl. .................................................. 119/15,
 55/487, 156/283, 131/266
[51] Int. Cl. ............................................. A01k 1/00,
 B01d 39/00, B01d 39/14
[50] Field of Search ................................... 119/15, 17,
 18; 55/487, 524, 528, 529; 131/10, 266

[56] References Cited
 UNITED STATES PATENTS
2,761,798  9/1956  Knudson ......................  131/10
3,304,913  2/1967  Nesher ..........................  119/15
3,343,520  9/1967  Schwarz ........................  119/15
 FOREIGN PATENTS
435,168  9/1935  Great Britain ............  131/266

Primary Examiner—Aldrich F. Medbery
Attorney—Anderson, Luedeka, Fitch, Even and Fabin ABSTRACT: A protective cover for an animal cage is made with a low permeability to prevent an air current or air movement from attaining a velocity to transport air-borne contaminants into or from the cage. The cover is formed of a fibrous web material having a resin material therein added to control and obtain the low permeability for the cover.

Patented Sept. 15, 1970

INVENTOR
CHARLES A. LEE

Anderson, Luedeka, Fitch, Even & Tabin
ATTYS.

Patented Sept. 15, 1970

INVENTOR
CHARLES A. LEE

Anderson, Luedeka, Fitch, Even & Tabin
ATTYS.

FILTER TYPE ANIMAL CAGE COVER

This invention relates to a protective cover for protecting animals in animal cages against diseases carried by air-borne contaminants and to the method of making the protective cover.

Present day large scale experimental research requires large colonies of animals such as mice, rats or the like to be born, raised and housed in cages within enclosed buildings. To efficiently house such large numbers of animals, they are usually housed in animal cages which are conveniently stacked in tiers and rows. This close proximity of animals renders them particularly susceptible to infectious diseases, which may wipe out colonies of such animals and cause the loss of very expensive and valuable research.

Mice and other animals may be very active and, as they walk and scratch and move about in their cages, bits of food, hair and other refuse may be knocked from their particular cage into another cage or workspace and contaminate other animals. Also, such animal activity may result in small particles of dust, excrement or other material containing viruses or bacteria becoming air borne and transported by air currents to cause infection of the colonies.

Attempts have been made to contain air-borne contaminant in the cages as well as to prevent the entry of contaminants from the ambient atmosphere into the cage. For instance, fiberglass mats have been secured to the tops of the cages in an attempt to filter dust and other particles from the air and this procedure has resulted in some success in filtering the larger sized particles from the air. However, air-borne virus, bacteria and other small particles passed through the fiberglass mat and infected animals in the cages. Moreover, such fiberglass covers were uncomfortable to handle because of the tendency of such fibers to become embedded in the hands of the persons handling the covers. Also, the covers were not sufficiently rugged to withstand the repeated handling which is required in use.

In an attempt to filter very small particles and viruses from air entering cages, covers have been made with extremely fine pores or openings between micro-fine fibers to prevent movement of viruses and the like through the filter medium. Specifically, U.S. Pat. No. 3,343,520 discloses a filter cover for the purpose made of a mixture of various fibers in which micro-sized fibers are incorporated for the purpose of filtering viruses, bacteria and very small particles from air entering the cages. However, covers of this type are not rugged and are not adapted to repeated use as well as having other disadvantages.

In short, there is a definite need for a cover to protect animals within cages against air-borne contaminants including viruses, bacteria and other very minute particles transporting the same. While the cover construction must effectively prevent the passage of disease bearing contaminants, it must be sufficiently permeable to air to provide the necessary oxygen level and at the same time to permit the dissipation of heat, humidity and carbon dioxide. The cover should also be sufficiently rugged to withstand repetitive handling and should be relatively non-irritating to humans handling the cover.

Accordingly, a general object of the invention is to provide a new and improved protective cover for animal cages of the foregoing kind.

Other objects and advantages of the invention will become apparent from the detailed description taken in connection with the accompanying drawings in which.

Figure 1:
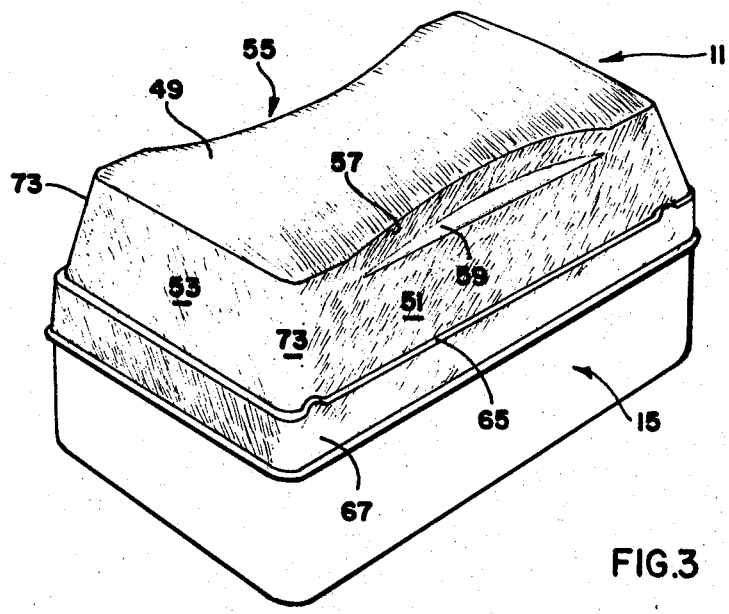
FIG. 1 is a perspective view of an animal cage having a protective cover constructed in accordance with the preferred embodiment of the invention.

As shown in the drawings for purposes of illustration, a protective cover 11 embodying various features of the invention is seated on the covers the open top of a cage 13 which includes a lower housing or pan 15 in the interior of which the laboratory animals are confined. The cage also includes a grate 17 formed of cross strips of metal or plastic across the top of the pan 15 to prevent escape of the animals from the pan.

As will be explained in greater detail, the protective cover 11 is made with a controlled permeability to air for the purpose of effectively preventing any air currents or air movement into the cage to attain a sufficient velocity to transport contaminants into or from the interior of the cage 15. The cover is formed of fibers which are matted together to define tortuous air passageways which serve to lower the velocity of air current to the point where air-borne contaminants cannot be supported. While the prior art has employed fine fibers and very small openings between fibers in an attempt to filter such particles, the protective cover of the present invention may use larger sizes of fibers, e.g., three or four denier polyester fibers, and larger openings between fibers so long as the transport velocity of any air currents attempting to pass through the protective cover 11 is effectively reduced by the various changes in direction caused by the tortuous passageways.

Figure 3:
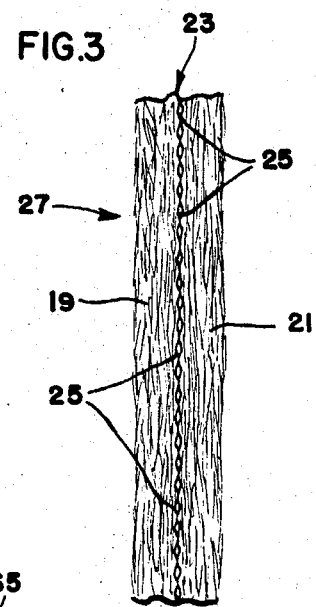
FIG. 3 is an enlarged, diagrammatic view of a cover material for the protective cover.
Figure 2:
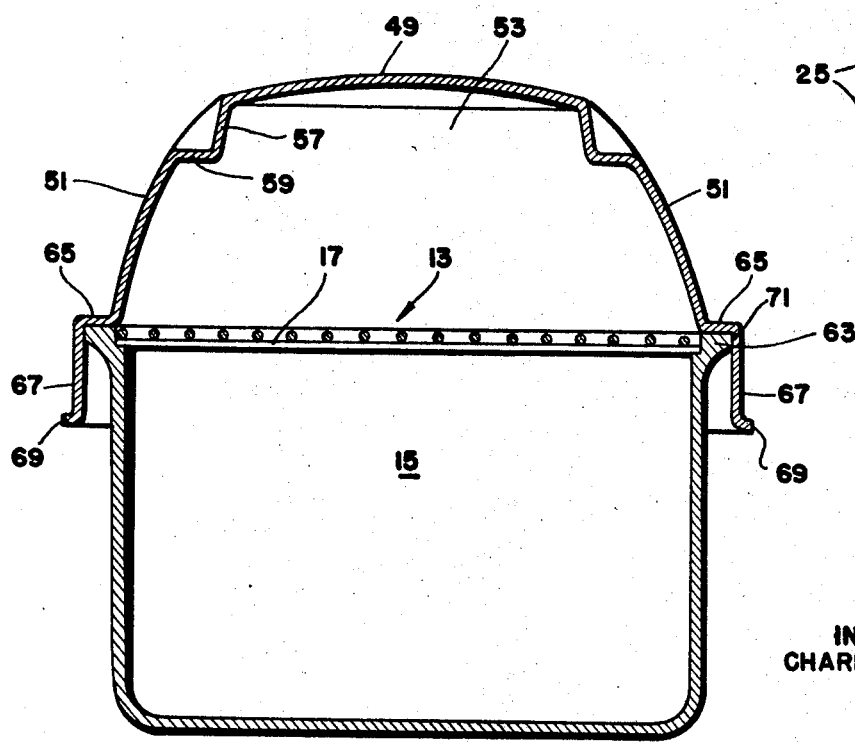
FIG. 2 is an enlarged sectional view taken substantially along the line 2—2 of FIG. 1.

In addition, as is pointed out in greater detail, the cover material is fabricated with a particulate barrier media 23 which provides a further decrease in permeability which even further reduces the air current in a controlled manner to provide optimum results. In the preferred embodiment of the invention, the barrier media 23 is provided by minute discrete particles 25 (FIG. 3) which are disposed on the fibers or filaments at the interface between the fibrous webs 19 and 21 and which are arranged to limit severely the transport velocity of particles at this interface. If a single web is employed, the particles may be disposed on one or both sides of the web to obtain permeabilities within the desired ranges.

The discrete particles 25 forming the barrier media are applied in a manner to lower the air permeability of the fibrous web or webs forming the cover from the air permeability for the raw material web or for a combination of such webs. In this instance, where two webs are employed, each of the fibrous webs has an initial air permeability, i.e., prior to application of the barrier particles 25 of approximately 120 cfm per ft.$^2$ at ½ inch H$_2$O pressure differential as measured by a Frazier air permeability tester. The cover material 27 is formed into the desired shape of cover by various means including sewing, cold forming or by a hot molding process in which the cover material 27 is stretched while in a heated condition during formation of the protective cover shape. Even after the deformation caused by stretching a flat initial sheet of cover material into the truncated pyramidal shape of the illustrated cover 11 by hot molding, the cover's permeability to air at a ½ inch H$_2$O pressure differential is within the range of about 40 to 100 cfm per square foot. Because at ambient room conditions no appreciable pressure differential exists between the inside and outside of the cover (in any event, much less than the ½ inch water pressure diffenential used in described test) and also because of the very wide area afforded by the protective cover for the passage of air into and from the animal cage 15, it has been found that the transport velocity of the air carrying virus, bacteria or other very small sized contaminants is reduced to the point that air currents are effectively blocked by the cover with the result that air-borne contaminants attempting to pass through the tortuous passageways of the fibrous webs and then through the barrier layer tend to drop out or become trapped in the cover. On the other hand, the volume of air needed to ventilate the cage is adequately provided by air movement through the large number of passages found in the wide expanse of cover. Thus, the humidity, temperature and carbon dioxide levels in the cage are essentially the same on both the inner and outer sides of the protective cover 11 except during periods of intense animal activity which usually are of limited duration.

Referring now in greater detail to the cover material 27 for the protective cover 11, the fibrous webs 19 and 21 may be formed of various kinds of filaments or fibers of synthetic or glass materials. In this connection, rayon, nylon, vinyl derivatives, polyethylene or glass fibers are contemplated. The fibrous webs 19 and 21 may be formed to have acceptable characteristics by processes such as air forming, water forming or mechanical spreading to obtain the desired strength, uniform density and permeability. These processes are generally well known in the prior art.

The preferred fibrous webs 19 and 21 are formed from a large number of staple length fibers or continuous filaments randomly disposed in three dimensions with the filaments being bonded to one another at a relatively large number of spaced points throughout the width, depth and length of the web. The preferred filaments are formed of polyester and are formed into a web by a spunbonded process in which continuous filaments are spun from spinnerettes into a web and are heat sealed to one another at a relatively large number of spaced points throughout the web. As the filaments are randomly oriented and have a large number of bonds between the filaments at their crossing points throughout the depth of the web, it has good strength and resistance to tearing and separating the filaments during the reorientation and stretching of filaments in the molding of the webs into the shape of the preferred protective cover 11. However, some fibrous matted webs do not have sufficient strength, stretchability or resistance to tear to undergo molding. If the cover is formed of such fibrous webs such as, for example, glass fibers, a cover material formed of these webs and barrier media may be formed into the desired shape by processes other than hot molding, as is illustrated and preferred.

The preferred webs 19 and 21 are spunbonded, non-woven webs of continuous filaments of polyester of approximately three or four denier (0.7 to 0.8 mils in diameter) of the kind sold under the trademark "Reemay" by E. I. du Pont de Nemours of Wilmington, Del. These preferred webs range in weight from about 1.5 oz./yd.$^2$ to 6 ozs./yd.$^2$ with the 6 oz. weight of web being preferred. The polyester filaments are preferred as they are highly resistant to the effects of heat and do not melt at temperatures below about 480 F. as contrasted to much lower temperatures for many other synthetic fibers. These spunbonded webs are quite open and permeable and have air permeabilities of 105 to 135 c.f.m. per ft.$^2$ at ½ inch H$_2$O pressure differential as measured by a Frazier air tester for 6 oz. material. In contrast to fiberglass mats or other very thick and open filter medium, each of the preferred webs 19 and 21 are quite thin, usually 10 to 30 mils in thickness and are relatively dense.

The preferred barrier layer 23 is formed of discrete particles of a thermoplastic resin which not only serve as the barrier layer to high velocity air flow, but also intimately and uniformly bond the webs 19 and 21 to one another to form a laminated cover material 27. The preferred resin particles are small (usually from 20 to 500 microns) and are closely spaced and uniformly distributed at the interface between the webs 19 and 21 to prevent the occurrence of areas which would allow air or air-borne particles to maintain a relatively high transport velocity through the protective cover webs 19 and 21. Also, a substantial nonuniformity in the barrier layer of particles 25 would result in pockets at the interface of the webs 19 and 21 into which air-borne particles could move and shift laterally to seek out imperfections or points of least resistance in trying to pass through the cover.

Particularly good results have been obtained with solid particles 25 of polyethylene sold under the trademark "Microthene" by U.S. Chemical Corporation and having a grain size of 297 microns, although satisfactory results have been obtained by using particles having a grain size from about 20 to 500 microns. Another suitable resin is a granular form of nylon sold under the trademark "Zytel" by Polymer Corporation and Electro Seal Corporation. The amount of resin particles applied has been satisfactorily varied from about 1.0 to 3.5 ozs. per square yard or about 10 percent to 30 percent by weight of the total weight of the cover material 11. By adjusting the amount of resin particles 25, the permeability of the cover may be decreased to provide the desired barrier effect to air currents. As will be explained in greater detail hereinafter in a description of a process for forming the cover material 27, these solid, resin particles form long fibrils or tendrils under suitable heat and pressure, and these tendrils extend into the respective webs to additionally aid in limiting air velocity and the trapping of contaminants in the protective cover 11. While solid particles of resin are preferred, the barrier layer 25 may be formed in other manners such as, for example, by discrete viscous liquid particles and droplets of small size disposed substantially uniformly at the interface of the respective fibrous webs 19 and 21. Plastic particles 25 may be incorporated into a suitable solvent which, when evaporated, will deposit the plastic in the desired manner.

The cover material 27 may be provided with various surface and strength characteristics by selecting different strengths, weights or kinds of fibers for its respective webs 19 or 21. For example, a relatively stiff and heavy web may be bonded to a less stiff and a lighter web to provide additional rigidity and strength to make the cover more rigid. On the other hand, a smooth surface web may be laminated to a rougher surface web to provide a smoother surface for preventing large particles of dust from entering into the interior of the fibrous webs of the protective cover 11. With large particles trapped on the outside of the smooth web, the cover 11 can be more readily cleaned of such dust particles than when these dust particles are trapped within the interior of the respective webs.

Figure 4:
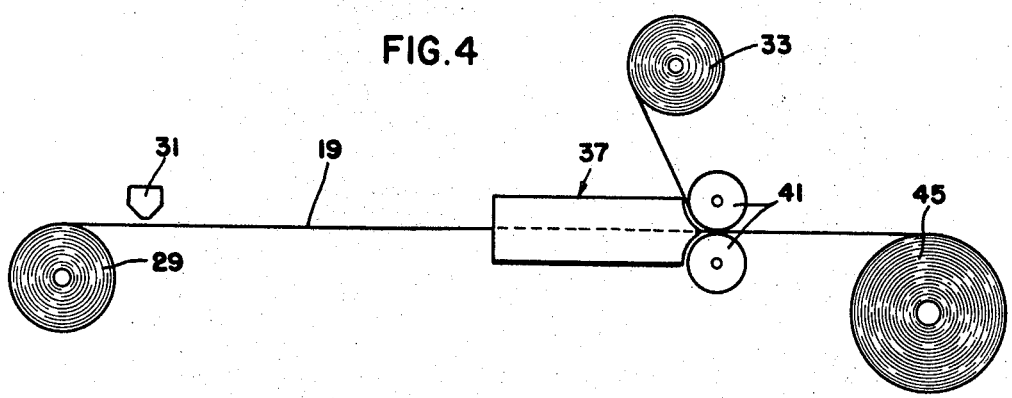
FIG. 4 is a diagrammatic illustration of a manner of making the cover material.

In accordance with the preferred method of making the cover material 27, a first web 19 (FIG. 4) is provided in supply roll 29 and is stripped therefrom for continuous travel past an applicator 31 which applies a fine layer of particles 25, such as the particulate polyethylene, evenly and uniformly on the top surface of the web 19. The rate of application of the particles 25 and the size of the particles employed is related to the desired permeability and the rate is usually set to a predetermined amount in the range of 1 to 3.5 ozs./yd.$^2$ of granular polyethlene having a grain size between about 20 and 500 microns.

The first web 19 with granules on it passes into a heating station 37 having a baffled heating zone with baffles extending to and touching a pair of nip rolls 41. In the present instance, the particles 25 are heated at the heating station by radiant heaters to approximately 290° F.−330° F. for granular polyethylene having a grain size of 297 microns.

The second web 21 is stripped from a supply roll 33 and directed downwardly to the nip of the pressure rolls 41. This second web 21 is at ambient temperature as it moves into engagement with the first web 19. The webs 19 and 21 are pressed together by the opposed pressure rollers 41 which force portions of the heated particles, now in the form of globules into the interstices of the respective webs. The heating of the particles is controlled rather precisely so that the globules are softened to flow under pressure but the temperature of globules is maintained slightly below the melting point thereof to prevent the globules from flowing as a liquid. If the particles were heated to a point where they are too liquid, the particles may flow laterally and join one another and thereby render the cover material impermeable over relatively large areas. As stated above, the plastic-state particles or globules, when subjected to pressure, are thought to produce hair-like fibrils or tendrils which extend into the interstices at the faces of both upper and lower webs because of the heating and light pressure being applied to the webs.

Before the globules spread significantly laterally, the combined webs 19 and 21 leave the nip of the pressure rollers 41 and the globules experience a rapid air cure. It takes only seconds for the globules and fibrils to resolidify and anchor the respective webs 19 and 21 to each other. As the globules and fibrils become solid, they bond the webs together. The solidified synthetic resin on the web filaments may also be described as nodular formations which function as means to reduce the permeability of the cover to the desired amount. From the pressure rollers 41 the now formed cover material 27 is pulled forward by and wound on a take-up roll 45.

The foregoing process has been employed to laminate various weights of spunbonded polyester webs to webs of similar or different weights. The degree of permeability and strength can be controlled by the selection of the thickness of the individual webs, the number of webs bonded together and the kinds of fibers from which the respective webs are made.

Prior to describing the method of molding a flat sheet of the cover material 27 into the desired shape, the illustrated, truncated pyramidal shaped cover 11 will be described in detail. The illustrated protective cover is formed with a body having an upper crowned top wall 49 and depending, integrally attached sidewalls 51 and end walls 53 which are inclined downwardly and outwardly from the top wall 49. To facilitate the gripping and handling of the protective cover 11, it is preferred to form suitable hand grips 55 on the top of the cover by means of a pair of opposed indentations in the top portion of the cover. In this instance, the indentations are defined by vertically disposed and inwardly curving walls 57 which extend downwardly and meet, at generally right angles, horizontally disposed shoulder walls 59. The walls 59 extend longitudinally for the length of the curved walls and extend outwardly therefrom to the remainder of the cover sidewall 51. The indentations 55 are spaced apart so that they are easily spanned by a hand gripping the cover between the thumb and fingers.

It is preferred that the cover 11 be provided with means to attach to and engage with a top rim 63 of the cage 13 and also that the cover be readily detachable from the rim 63 to facilitate inspection of the animals in the interior of the cage. To these ends, the lower portion of the cover end walls and sidewalls are formed with outwardly extending, horizontally disposed ledges 65 which are adapted to rest on the top of the cage rim 63. About the lower edge of the cover is a downwardly depending skirt 67 which encircles the exterior of the housing rim 33 and is disposed in close but spaced relationship to the vertical walls of the pan 15. The skirt 67 terminates in the lower, outturned edge 69. The skirt 67 with a slight taper may engage a vertical side 71 of the cage rim 63 and thereby hold the cover against being canted or tipped and prevent direct air flow between the cover ledge 65 and the top cage rim 63 if they do not fit flush with one another.

The preferred protective cover 11 is formed with gently curved corners 73 between sidewalls 51 and end walls 53. The preferred truncated, pyramidal shape has its end and sidewalls inclined to the extent to facilitate nesting of number of protective covers 11 within each other and thereby requires but a minimum amount of space during storage or shipment.

Figure 5:
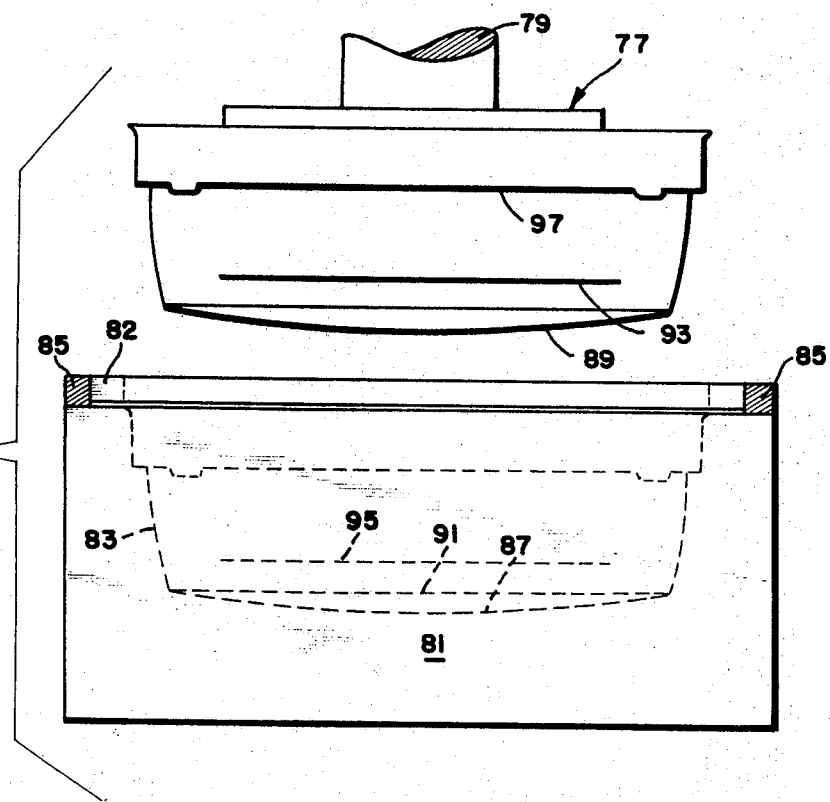
FIG. 5 is a diagrammatic view of an apparatus for molding the cover material into the protective cover illustrated in FIG. 1.

Prior to formation of a flat sheet of the cover material 27 into the truncated pyramidal shaped cover 11 of FIG. 1, it is heated in a suitable oven (not shown) to a temperature sufficient to soften the fibers and/or their bonds so that the fibers can reorient into the desired shape. The heated cover material 27 may be formed in a suitable molding apparatus such as the plug molding apparatus shown in FIG. 5. In this instance, the molding apparatus includes a plug 77 attached to the lower end of a ram 79. The plug is aligned with and disposed above a die 81 which is formed with an appropriate cavity 83 to receive the plug.

Prior to insertion of the plug 77 into the die 81, the sheet of cover material 27 is attached to a ring-shaped holder 82 by forcing the marginal edges thereof into tenterhooks disposed about the outer edge of the ring-shaped holder. The latter is then placed on the top of the die 81 and held against lateral shifting by suitable exterior guide blocks 85. The ring-shaped holder 82 grips the marginal edge of the sheet and is later trimmed from the sheet at the outturned edge 69 of the finished protective cover 11.

The mold cavity 83 may be shaped generally complementary to the exterior wall of the protective cover 11, and the shape of the plug 77 is generally complementary to the interior wall of the protective cover 11. Thus, a curved surface 89 on the lower end of the plug 77 is curved similar to the top wall 49 of the cover. Shoulders 91 in the die cavity 83 and adjacent curved vertical walls in the die cooperate with similar shoulders 93 and curved walls on the plug 77 to form the hand grip indentations 55. A suitable ledge 95 in the die cavity wall cooperates with a parallel ledge 97 on the plug 77 to form the cover ledge 65 which will engage the rim 33 of the cage.

A specific example of the protective cover made in accordance with the invention will now be given for the purposes of illustration only. A pair of webs 19 and 21 each weighing six ounces/yd.$^2$ of spunbonded "Reemay" webs of crinkled, three denier (0.7 mils in diameter) polyester filaments were laminated together with 297 micron particles of high density polyethylene in accordance with the method described above in connection with FIG 4. Prior to laminating, each web has an air permeability of 120 cfm/ft.$^2$ at ½ H$_2$O pressure differential as tested with a Frazier air tester. A 14 inch by 19 inch rectangular sheet of the flat cover material 27 formed by the above above laminating method was secured to the ring holder 82 and heated in an oven to a temperature in the range of about 350°—375°F. The heated cover material 27 was then transferred to the molding apparatus and positioned in place on the top of the die 81. The ram 79 was brought downwardly to bring the plug 77 against the top of the cover material 27 and the plug 77 continued downwardly into the die cavity 83 to form the molded shape of the cover 11. At the time of stretching and molding of the cover material 27, the temperature thereof had cooled to within the range of about 250°—300°F. Preferably, the plug 77 was held in the die cavity 83 for about one minute during which the stretched and reoriented filaments became set to retain the molded shape when the plug 77 was retracted upwardly. After retraction of the plug 77, the new formed cover was allowed to cool for sufficient time to become self-sustaining. This usually takes only several minutes. The now cooled cover was then removed from the die and was ready for use.

The protective cover 11, formed above, is about 4¾ inches deep and is trimmed to be approximately 16 inches in length and 9 inches in width. It will be appreciated that the amount of stretching of the cover material is quite extensive in some areas to achieve this depth. Good results have been obtained in which the stretch or elongation has been as much as about 60 percent.

Despite the very considerable stretching of the cover material 27 and the heating thereof, the finished molded protective cover 11 has a quite limited permeability throughout its various portions. During molding, the filaments reorient and attenuate and the elongation increases the permeability in most portions of the cover 11 from the permeability of the cover material 27 prior to molding. For example, a flat sheet of the cover material 27 of the above example had a substantially uniform air permeability across the entire area of the sheet of approximately 8 cfm/ft.$^2$ at a ½ inch H$_2$O pressure differential as measured by a Frazier air test prior to being molded. After molding, the air permeability averaged about 57 cfm/ft.$^2$ at the cover top wall 49, 62 cfm/ft.$^2$ at the sidewalls 51 and 78 cfm/ft.$^2$ at the end walls 53 at the ½ inch H$_2$O pressure differential. Good results have been obtained with the cover having a range of permeabilities of about 40 to 100 cfm/ft.$^2$ at ½ inch H$_2$O pressure differential. It is preferred to keep the average cover permeability about 60 cfm/ft.$^2$ to provide suitable ventilation and to block air currents from sweeping contaminants through the cover. Because of the wide surface area for air flow and the lack of any substantial pressure drop across the cover, the velocity of air through the cover will be extremely low. The combination of tortous paths through the webs of the protective cover and the barrier media provides a low transport velocity of air which results in protection from air-borne contaminants to a degree heretofore not attainable with prior art filter covers.

Illustrative of the unique protective characteristics for the protective cover 11 are the results obtained when housing so called sterile or "germ free" mice under similar sets of conditions in cages having a conventional filter cover and the protective cover 11 of this invention. These germ free mice are the result of housing and breeding many generations of mice within extremely sterile surroundings so that the mice do not have the usual resistance to infectious diseases and viruses. In one set of tests, baby, germ free mice were surgically removed from their mother's womb and placed in sterile cages covered by filter covers of the prior art; the baby mice have survived for only about 24 hours. In contrast, similar baby, germ free mice have been housed in similar cages with the protective cover 11 and have survived for approximately 30 days. Of course, the germ free mice and the cages were removed to a sterile room for feeding and cleaning the cages, at which time the protective covers 11 were opened, but otherwise the protective covers 11 were the only protection the mice had against being contaminated by air-borne bacteria or viruses.

The protective cover 11 may be made in other shapes than that illustrated. For example, a suitable shouldered receiving groove may be formed in one of the ends or sidewalls 51 or 53 to hold a punched card identifying the animals in the cage and tests being run for the purpose of aiding in furnishing data to a computer. The shape of the cover also may be changed considerably more extensively from the illustrated truncated pyramid and still fall within the purview of the invention. It will be appreciated that after a certain period of usage the protective cover 11 may have a large number of contaminants trapped therein. Rather than disposing of the protective cover 11, it may be suitably sterilized in a sterilizing gas such as ethylene oxide or the like and then reused once more.

Thus, it will be seen that the present invention provides a new and improved cover which has a barrier layer of synthetic resin formed into nodular formations attached to the filaments to assure that air passing through the cover is held to a very low velocity and must flow throw tortuous passageways to cause the air to deflect and change directions whereby the air-borne viruses or particles drop out within the cover. The protective cover is capable of being manufactured by molding processes and may be made at sufficiently low cost so as to compete and replace the covers of the prior art.

While a preferred embodiment has been shown and described, it will be understood that there is no intent to limit the invention by such disclosure but, rather, it is intended to cover all modifications and alternate constructions falling within the spirit and scope of the invention as defined in the appended claims.

I claim:

1. An animal cage cover comprising a body to fit on said cage, said body including at least one web formed of matted, long, randomly oriented filaments bonded throughout the width, depth and length of the web with intercommunicating voids between filaments providing tortuous passageways for the passage of air, and a barrier layer of spaced apart plastic particles adhered and fixed to said filaments in said web constituting a means for reducing the air permeability through said web to a predetermined permeability to thereby reduce the transport velocity of air at ambient conditions so that air-borne contaminants will not be carried through said cover.

2. A cover in accordance with claim 1 in which the air permeability of said cover is within a preferred range of about 40 to 100 cfm/ft.$^2$ at a pressure differential of ½ inch $H_2O$.

3. A cover in accordance with claim 1 in which said body is formed with first and second webs each formed of matted, long, randomly oriented filaments and in which said resinous barrier layer bonds said webs together and is intermediate said webs providing a region of reduced permeability relative to said webs.

4. A cover in accordance with claim 3 in which the filaments are synthetic filaments joined at spaced points and in which said barrier media is a layer of particles formed of discrete particles of a thermoplastic material uniformly and evenly dispersed at the interface of said webs and bonding said webs intimately together at closely spaced points to eliminate void pockets at the interface between the webs.

5. An animal cage cover in accordance with claim 1 in which said cover is in the shape of a truncated pyramid and in which said covers may be nested one with another.

6. An animal cage cover in accordance with claim 5 in which said cover body has a top wall and depending side walls and in which said depending side walls are formed with a surface to engage against the rim of the animal cage and in which a skirt extends downward from said surface to encircle the rim of the animal cage.

7. A cover for an animal cage comprising a body to fit on said cage, said body including at least one web formed of matted, randomly oriented fibers of at least staple length with interconnecting voids between fibers and having passageways for the passage of air and a barrier media of synthetic resin adhered and fixed to said filaments in said web and forming nodular formations of synthetic resin constituting a means for reducing the air permeability of said web to within a predetermined range of air permeabilities and to cause tortuous passageways which reduce the transport velocity of air at ambient conditions so that air-borne contaminants will be blocked from passing through said cover.

8. A cover in accordance with claim 7 in which said body includes first and second webs and in which said synthetic resin nodular formations bond said webs together.